United States Patent
Torgersrud

(10) Patent No.: US 9,171,288 B2
(45) Date of Patent: Oct. 27, 2015

(54) PREDICTING AN IDENTITY OF A PERSON BASED ON AN ACTIVITY HISTORY

(71) Applicant: Telmate, LLC, San Francisco, CA (US)

(72) Inventor: Richard Torgersrud, San Francisco, CA (US)

(73) Assignee: Intelmate LLC, San Francisco, CA (US)

(*) Notice: Subject to any disclaimer, the term of this patent is extended or adjusted under 35 U.S.C. 154(b) by 303 days.

(21) Appl. No.: 13/838,403

(22) Filed: Mar. 15, 2013

(65) Prior Publication Data

US 2014/0279789 A1 Sep. 18, 2014

(51) Int. Cl.
*G06Q 30/02* (2012.01)
*G06Q 10/10* (2012.01)

(52) U.S. Cl.
CPC ............... *G06Q 10/10* (2013.01); *G06Q 30/02* (2013.01)

(58) Field of Classification Search
USPC ......................................... 706/46, 18, 20, 21
See application file for complete search history.

(56) References Cited

U.S. PATENT DOCUMENTS 7,269,628 B1 * 9/2007 Buchsbaum et al. ......... 709/206

* cited by examiner

*Primary Examiner* — Jeffrey A Gaffin
*Assistant Examiner* — Nathan Brown, Jr.
(74) *Attorney, Agent, or Firm* — McDermott Will & Emery LLP

(57) ABSTRACT

Systems and methods for predicting an identity of a person are provided. In some aspects, a list of subject activities accessed by a subject person is received. For each of a plurality of stored persons, a stored list of activities accessed with by the stored person is accessed in one or more data repositories. An intersection is calculated between the list of subject activities and the stored list of activities for at least one stored person from the plurality of stored persons. That the subject person is likely to correspond to the at least one stored person from among the plurality of stored persons is predicted, based on the calculated intersection. An indication that the subject person is likely to correspond to the at least one stored person from among the plurality of stored persons is provided.

16 Claims, 3 Drawing Sheets

PREDICTING AN IDENTITY OF A PERSON BASED ON AN ACTIVITY HISTORY

CROSS-REFERENCE TO RELATED APPLICATIONS

The present application relates to U.S. patent application Ser. No. 13/602,837, entitled, "Personally Allowable Numbers System," U.S. patent application Ser. No. 13/469,632, entitled, "Investigative Tree," and U.S. patent application Ser. No. 13/438,940, entitled. "Secure Social Network," the disclosures of which are hereby incorporated by reference in their entirety for all purposes.

BACKGROUND

The subject technology generally relates to information systems and, in particular, relates to predicting an identity of a person based on an activity history.

Persons who are incarcerated in a secure facility, typically referred to as inmates, are so incarcerated because they have been either charged or convicted of one or more criminal acts. Due to the high rate of recidivism, many of them are frequently arrested and spend significant amounts of time inside one or more secure facilities.

As such inmates generally desire to avoid incarceration, or at least lengthy incarceration, they as a group tend to more often obscure their true identity through the use of false names, doctored or otherwise fraudulent identification (ID) cards or driver's licenses, traveling without any ID documents of any kind, and other schemes intended to avoid associating them with criminal acts or investigations.

When these multiple crimes and investigations are geographically spread out, crossing jurisdictional boundaries, many of these methods prove successful because of the high cost or logistics involved in checking means of identification that do not rely on paper or plastic documents or truthful answers, such as DNA analysis, fingerprint matching, and other similar biometric comparisons. Especially when these repeat offenders are arrested for lower-level crimes, police officers and secure facility administrators may be disinclined to expend the time, resources, and money required to perform these enhanced ID matching tests.

SUMMARY

In some aspects, the disclosed subject matter relates to a computer-implemented method for predicting an identity of a person. The method includes receiving a list of subject activities accessed by a subject person. The method includes accessing, in one or more data repositories, for each of a plurality of stored persons, a stored list of activities accessed by the stored person. The method includes calculating an intersection between the list of subject activities and the stored list of activities for at least one stored person from the plurality of stored persons. The method includes predicting, based on the calculated intersection, that the subject person is likely to correspond to the at least one stored person from among the plurality of stored persons. The method includes providing an indication that the subject person is likely to correspond to the at least one stored person from among the plurality of stored persons.

In some aspects, the disclosed subject matter relates to a non-transitory computer-readable medium encoded with executable instructions. The instructions include code for receiving a list of subject activities accessed by a subject person. The instructions include code for accessing, in one or more data repositories, for each of a plurality of stored persons, a stored list of activities accessed by the stored person. The instructions include code for calculating an intersection between the list of subject activities and the stored list of activities for at least one stored person from the plurality of stored persons. The instructions include code for predicting, based on the calculated intersection, that the subject person is likely to correspond to the at least one stored person from among the plurality of stored persons. The instructions include code for providing an indication that the subject person is likely to correspond to the at least one stored person from among the plurality of stored persons.

In some aspects, the disclosed subject matter relates to a system. The system includes one or more processors and a memory including instructions. The instructions include code for receiving a list of subject activities accessed by a subject person. The instructions include code for accessing, in one or more data repositories, for each of a plurality of stored persons, a stored list of activities accessed by the stored person. The instructions include code for calculating an intersection between the list of subject activities and the stored list of activities for at least one stored person from the plurality of stored persons. The instructions include code for predicting, based on the calculated intersection, that the subject person is likely to correspond to the at least one stored person from among the plurality of stored persons. The instructions include code for providing an indication that the subject person is likely to correspond to the at least one stored person from among the plurality of stored persons.

Other configurations of the subject technology will become readily apparent from the following detailed description, where various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
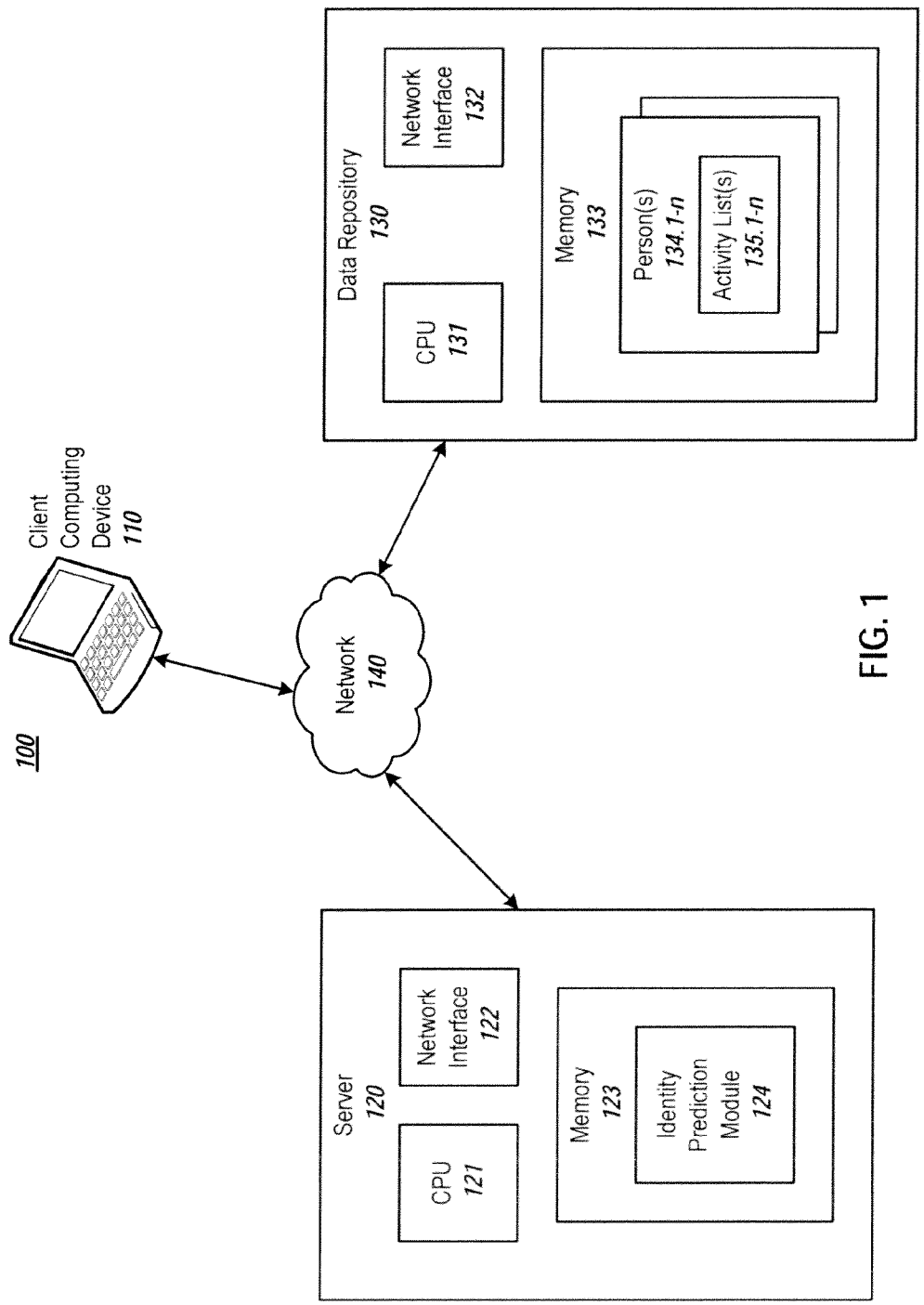
FIG. 1 illustrates an example of a system for predicting an identity of a person.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, certain structures and components are shown in block diagram form in order to avoid obscuring the concepts of the subject technology.

One goal of the subject technology, among others, is to provide an alternative means of identifying and tracking repeat offenders, as described above, even as the repeat offenders take actions designed to obscure their true identity, and do so in a semi-automated fashion using data mining and other techniques that are easy, fast, and inexpensive to perform, thereby increasing the odds that a re-arrested inmate using a false identity may be matched to all other identities the inmate has used while incarcerated.

In some examples, the subject technology relies on human nature. Humans are social animals and generally break connections with friends and family with great reluctance. Although inmates may be ashamed of some friends and family learning of their being incarcerated, most will still have circles which they crave contact for. As a result, it is highly likely that any particular repeat offender will set about contacting a same set of friends and family each time the offender is incarcerated, even if the offender is otherwise attempting to conceal the identity of the offender.

In some examples, the subject technology relies on such patterns as an investigative tool. Even if inmates try to limit their contacts with outsiders, they are likely to contact just enough people in common each time they are incarcerated that simple overlap tests and/or statistical analysis are likely to highlight aliases that are likely to be the same individual. At the very least, these inmates are unlikely to be as aware of how commonly degrees of separation apply to groups of friends and acquaintances.

For instance, in the simplest pattern to spot, any particular inmate may always call the same telephone number first each time he is incarcerated. Once certain types of numbers, such as bail bonds offices, are excluded, it may be surmised that all persons calling that particular number first upon incarceration may at least know each other, be related, or in fact be the same person.

The subject technology, according to some implementations, provides a mostly automated or a fully automated approach for screening an incarcerated inmate (e.g. a newly incarcerated inmate) for possible concealment of true identity.

The subject technology, according to some implementations, collects and compares data relating to newly, currently, and previously incarcerated inmates, and all of their friends and family members who have used the Inmate Telephone Service (ITS) and/or Video Visitation Service (VVS). The analysis and comparisons of these data are used to detect the possibility that some of these said inmates and/or friends and family members are using false identities intended to obscure the fact that the said individual is wanted for a criminal-related matter, is prohibited from communicating with one of said inmates, or for other reasons relative to law enforcement and/or the operation of secure facilities.

The subject technology, according to some examples, includes the step of collecting and identifying data relating to newly released inmates and their interactions with friends and family members that can be investigated. The subject technology, according to some examples, includes the step of social graph creation and display tools, including those described in U.S. patent application Ser. No. 13/469,632, entitled, "Investigative Tree." The subject technology, according to some examples, includes the step of estimation that two or more user accounts (any combination of current inmate, former inmate, or friend & family member) are likely to be the same person using different aliases.

In some examples, the data collected about inmates, their friends and family members, and their interactions during the normal course of using the telephone and video visitation systems provided by the service are archived as a normal course of practice. This data is then analyzed at later points, such as upon the incarceration of an individual, the request of an investigator, or other similar event that results in a desire to determine if one or more individuals have registered under an alias.

Carrying out the analysis of the collected data about inmates, as described herein, can provide a benefit to secure facility administrators and law enforcement officials, who may elect to not conduct thorough background checks or other identity verification upon the arrest or incarceration of individuals so detained because of low-priority crimes (for example, to reduce cost in terms of money or employee hours). Because such individuals are likely to have committed higher priority crimes, providing an automated and comparatively inexpensive means of detecting the use of false identities is desirable.

Upon detainment for or conviction of a crime, an individual is typically incarcerated in a secure facility, such as a jail or prison. During the intake process, the belongings on the individual's person are confiscated, analyzed, and stored for use in the criminal investigation, court case, and eventual return to the individual upon their release (with the obvious exception of any illegal items, which are generally kept from the individual). Once this process is complete, the individual is then generally referred to as an inmate.

The confiscated items may contain many things which could aid in the accurate identification of the inmate, such as driver's license, credit cards, address book, cellular telephone containing an electronic contact list, business cards, paper and electronic notes, and various computing devices, some of which may contain additional electronic contact lists, telephone numbers, computer hardware or service logins or indications thereof, computerized social networking accounts, etc. The various electronic contact lists, including telephone numbers, e-mail addresses, and social networking accounts may be imported into the system as described in U.S. patent application Ser. No. 13/842,031, entitled, "Inmate Network Priming," the entire disclosure of which is incorporated herein by reference.

Thereafter, the inmate is placed before either a booking kiosk or a video visitation kiosk (as described in U.S. patent application Ser. No. 13/088,883, entitled, "Interactive Audio/Video System and Device for Use in a Secure Facility." the entire disclosure of which is incorporated herein by reference) for enrollment in the Video Visitation System (as described in U.S. patent application Ser. No. 13/088,883). The enrollment process can include assigning the inmate a unique ID called a Personal Identification Number (PIN, which may or may not be the same as the inmate's booking number, but which will be unique at least within the facility he is incarcerated at), a full name, a profile photo, and other identifying information. The enrollment can also include additional biometric scans, including use of a fingerprint reader and/or iris print reader, for example. The profile photo may be recorded as a short video clip, even if presented as a single still image. The inmate's profile may additionally be linked to, or have data imported from, the facility's Jail Management System (JMS), which is a computerized record-keeping system generally used by secure facilities to track all manner of status relating to each inmate, including charges and booking information, dietary restrictions, gang affiliations, intake and expected release dates, etc.

After initial enrollment, the inmate is thereafter brought to the section of the facility he is assigned to, and placed in his assigned cell. At some point thereafter, the inmate will be given the opportunity to use telephones or video visitation terminals located near the inmate's cell and accessible to the inmate. Upon making a first call or video visitation, the system shall capture the audio and (if applicable) video streams of the call or visit, along with details about the phone number or visitor contacted, as is typically done for each call or visit.

Attention can be given to these first recordings, for the purposes of matching the inmate's biometrics to those of previously detained individuals. Up to now, no effort has been made to attempt to identify the inmate's potential use of a false identity, so as to avoid discouraging him from continuing to believe he has succeeded in the deception, and will thus continue with typical patterns of contact, so as to provide useful data to facility administrators and investigators.

In particular, the voice recording during enrollment typically only includes the inmate stating his name, and this short length of audio is less reliable for use in voiceprint comparisons. Thus, it is most desirable to capture a longer recording, and using a first telephone or video call is a natural source for a longer, natural voice sample.

Once recorded, said voice sample is then processed as required by the voice recognition algorithm for comparison to recorded and stored voice samples of other persons who have used the ITS or VVS systems, including both inmates and friends & family members having resided at or visited any facility served by the ITS or VVS system.

Next, the still and video images of the inmates head captured during enrollment are similarly compared against stored images and videos of other persons who have used the VVS system at any facility ever served by said system.

Next, the inmate's calls and video visitations over an initial period, which may, in some examples, be several weeks for facilities with high average incarceration times, yet as low as a few days or hours for facilities with low average incarceration times, are cataloged and recorded, and a similar voice and facial recognition is performed on all of the people whom the inmate communicates with, and the recorded samples are also compared against the above-mentioned databases. The telephone numbers, e-mail addresses, and other electronic contact addresses used by the inmate are also compared against the contacts all other inmates at all facilities served by the ITS and VVS systems have made during a similar initial period of their incarceration.

Next, the inmate's use of other features on the audio/video kiosk are logged over the same initial period, including web browsing history, video games played, educational resources used, commissary items bought, medical issues reported, legal terms and documents searched, religious services viewed, self-help groups (such as AA, NA, etc.) joined or interacted with, music, TV, video, and other media listened to or viewed, and any number of other features and services provided by the audio/video kiosk.

Next, the funding sources for the inmate's trust account, telephone calls, video visitations, and geographic locations thereof are logged over the same initial period.

At the end of this initial period, the collected data is automatically analyzed by the system for repeating identical or similar patterns of usage of all or a subset of the above-mentioned items during a similar initial period length, for all previous inmates at the same facility and at all other facilities served at any point by the same system. The results are then scored, ranked, and presented to a facility administrator or investigator, along with photos and personal identifying details of each inmate record with patterns similar to the newly incarcerated inmate. The investigator may then evaluate whether the newly incarcerated inmate may be that same individual.

Subject to the exclusion of certain types of commonly dialed numbers (such as bail bonds offices and public defenders), particular weight is given to the first number called if a match is found to the first number dialed for any other inmate recorded in the system. Similar weight is given to the first number dialed, if the number does not match any other first number dialed but a lookup in a database such as best known name and address (BKNA), online white pages, or reverse number lookup is the same. Either of these matches on the first number called or same name or address on first number called will trigger an automatic review by facility administrators, wherein the profile and booking photos, and all identifying information about the inmates is presented on-screen.

Regardless of an identical or close match on the first number dialed by the inmate, a second level of comparisons covering all calls, visits, and funds deposited over the same initial period is performed.

Several processes of analyzing similar patterns of commonality among these data can be performed, including but not limited to: a simple comparison of the percentage of all calls, visits, and funding sources over the initial period being the same or related; a sliding window of the first n calls being the same, whereby the system checks the first two calls from among all inmates, then the first three, then the first four, and so-on up to a certain point which may be defined as when the length or cost of searching the database becomes too great, or the percentage of successful matches drops below a given threshold; or other processes of statistical analysis, as are understood or practiced by those skilled in the art.

Any apparent pairs of inmates using different aliases that are confirmed by the facility investigator as being the same individual (by whatever verification test, in fact, deemed appropriate by the facility), the investigator then indicates to the system which pairs of aliases are the same individual, and all said system profiles for said aliases are merged into one profile by the system, preserving a complete history of all records, and either maintaining the unique database key of one of the profiles, or creating a new unique database key. In some implementations, the database is replaced with a data repository or any data storage unit.

One difficulty in presenting the above-described information occurs when suspected aliases originate from different facilities having different owners or operators (for instance, typically the sheriff of a county). The owners or operators of the different facilities may have rules that give their ownership of certain type of inmate profile information, and preventing said details from being shared with other facilities without their express permission. In these cases, the system may instead indicate that there is a match to certain types of data (such as n number of calls in common, or inmate heights match within a 5% tolerance) without displaying the exact content or details of the information from facilities outside the jurisdiction or operational control of the facility performing the investigation.

The facility investigators may manually adjust the percentages or thresholds of certainty used to filter and display suspected aliases of the same inmate. The system will then record which such percentages and/or thresholds result in the highest percentage of confirmed aliases, and report these results back to the software developer, or automatically back to the central system software. The system software then automatically uses the aggregate settings and success rates reported by all facilities served by the system to adjust the default percentages and thresholds initially presented to investigators.

Thus, over time, the system is self-learning, and begins reporting the most common dialing, visiting, and other patterns associated with the use of aliases or false identities system-wide. This self learning is used to increase the accuracy of future queries and threshold settings.

Tracking Inmates after Release

The techniques described above can be used to detect the case where an inmate assumes one or more aliases upon release from the secure facility, and uses one or more of those aliases to establish a friends and family account with the ITS and/or VVS system, for the purpose of communicating with formerly fellow inmates who are still incarcerated.

Such detection schemes are similarly performed over an initial period, and may be done over said initial period for all newly enrolled friends and family members using the ITS and/or VVS systems. As with the inmates, such analysis can be performed without the subject's knowledge, so as to avoid causing the subject to change the inmate's contact or funding behavior, thus maintaining activity of use to facility investigators.

Upon detecting likely matches of a friends and family member to a former inmate, the system again presents the possible matches to a facility investigator, who may then take one or more of several actions upon confirmation. The actions can include blocking the account from using the system entirely, if the individual is prohibited from contact with existing inmates. The actions can include allowing interactions to continue, so as to build up additional evidence against the former inmate and/or current inmates. Such interactions may, in some cases, be alarmed so that investigators are notified prior to or at the start of each communication, and be given the opportunity to reject or monitor the communication. The actions can include merging the newly created friend and family profile details back into the individual's inmate profile, so as to preserve a continuous profile for the individual. This profile may then be used the next time the inmate is incarcerated at a facility using the same ITS or Video Visitation System. The actions can include using biometrics, physical description, and/or communication patterns (including, for example, called numbers, persons depositing funds, deposit amounts) to associate multiple inmate records that may be associated with the same person. The subject technology could be used in, among other cases, a case where an arrestee that has no ID and will not provide a name, is tied through biometrics or communication patterns to one or more other inmate records from the same incarceration facility or other incarceration facilities. All these individuals may in fact be the same person.

FIG. 1 illustrates an example of a system 100 for predicting an identity of a person.

As shown, the system 100 includes a client computing device 110, a server 120, and a data repository 130 configured to communicate with one another via a network 140. While the client computing device 110, the server 120, and the data repository 130 are illustrated as separate machines, in some examples, two or more of the client computing device 110, the server 120, or the data repository 130 can be implemented as a single machine. Also, while a single client computing device 110, server 120, and data repository 130 are illustrated, the subject technology can be implemented with multiple client computing devices 110, servers 120, or data repositories 130. The network 140 can include one or more of a wired network, a wireless network, a local area network (LAN), a wide area network (WAN), the Internet, an intranet, a cellular network, a telephone network, a virtual private network (VPN), etc. The network 140 can be a secure network to prevent unauthorized access to data stored on the network (e.g. data about inmates in a prison system).

The client computing device 110 may include one or more of a laptop computer, a desktop computer, a mobile phone, a personal digital assistant (PDA), a personal digital music player, a tablet computer, a netbook, a television with one or more processors embedded therein or coupled thereto, a physical machine, or a virtual machine. The client computing devices 110 may include one or more of a keyboard, a mouse, a display, or a touch screen. In some examples, the client computing device 110 includes a web browser configured to display webpages, for example a webpage implementing a web application for predicting an identity of a person. In some examples, a special purpose application (e.g., a desktop application) can be used for predicting an identity of a person at the client computing device. If the subject technology is implemented in a prison context, the client computing device 110 can be a computer of a sheriff or a prison owner, operator, or manager.

The server 120 can include a single machine with a single processor, a multiprocessor machine, or multiple machines with multiple processors in a server farm. As shown, the server 120 includes a central processing unit (CPU) 121, a network interface 122, and a memory 123. The CPU 121 includes one or more processors. The CPU 121 is configured to execute computer instructions that are stored in a computer-readable medium, for example, the memory 123. The network interface 122 is configured to allow the server 120 to transmit and receive data in a network, e.g., to communicate with the client computing device 110 or the data repository 130. The network interface 122 may include one or more network interface cards (NICs). The memory 123 stores data and/or instructions. The memory 123 may be one or more of a cache unit, a storage unit, an internal memory unit, or an external memory unit. As illustrated, the memory 123 includes an identity prediction module 124.

The identity prediction module 124 includes code for receiving, from the client computing device 110, a request to predict an identity of a person (e.g., an inmate). The identity predication module 124 includes code for accessing the data repository 130 to determine whether any of the persons whose information is stored in the data repository 130 corresponds to the requested person. The identity prediction module 124 includes code for reporting the result of the determination to the client computing device 110. Some examples of the operation of the identity prediction module 124 are described in conjunction with FIG. 2, below.

The data repository 130 can be implemented as a database or any other data storage unit. As shown, the data repository 130 includes a central processing unit (CPU) 131, a network interface 132, and a memory 133. The CPU 131 includes one or more processors. The CPU 131 is configured to execute computer instructions that are stored in a computer-readable medium, for example, the memory 133. The network interface 132 is configured to allow the data repository 130 to transmit and receive data in a network, e.g., to communicate with the client computing device 110 or the server 120. The network interface 132 may include one or more network interface cards (NICs). The memory 133 stores data and/or instructions. The memory 133 may be one or more of a cache unit, a storage unit, an internal memory unit, or an external memory unit. As illustrated, the memory 123 includes representations of person(s) 134.1-$n$ and activity list(s) 135.1-$n$.

As shown, each person 134.$k$ is associated with an activity list 135.$k$, where k is a number between 1 and n. The person 134.$k$ data structure can also store other data about the person, for example, a name of the person, a criminal history of the person, etc. The activity list 135.*k* stores a list of activities engaged in by the person 134.*k*. The activity list 135.*k* for a person 134.*k* can include one or more of: a list of telephone contacts of the person 134.*k* (e.g., telephone numbers dialed or a stored set of telephone numbers on an electronic device), a list of visitors visiting the person 134.*k*, a list of Internet pages accessed by the person 134.*k*, a list of online games accessed by the person 134.*k*, a list of educational, religious, or self-help programs accessed by the person 134.*k*, etc. Educational programs can include, for example, high school or college courses. Religious programs can include, for example, religious services. Self-help programs can include, for example, programs for curing alcohol or drug addiction. If the person 134.*k* has access to an electronic messaging (e.g., email) account, the activity list 135.*k* can include contacts from the electronic messaging account. If the person 134.*k* has access to a financial account (e.g., a bank account or a prison trust account), the activity list 135.*k* can include funding source(s) for the financial account.

In some implementations, the activity list(s) 135.1-*n* can include activities from a limited time period. For example, in an incarceration system, the limited time period can correspond to a period of incarceration, a first or other fraction of an expected or typical period of incarceration (e.g., a first three months of incarceration in a facility where an average inmate is incarcerated for nine months), a period of a fixed length (e.g., a first month of incarceration or a first day of incarceration), etc. In some implementations, permissions may be required to access one or more of the activity list(s) 135.1-*n* or to access any identifying information of the person(s) 134.1-*n*. The permissions may be provided manually by an owner or operator of an incarceration facility hosting the relevant person(s) or by a government official (e.g., a judge, a magistrate, or a sheriff).

Figure 2:
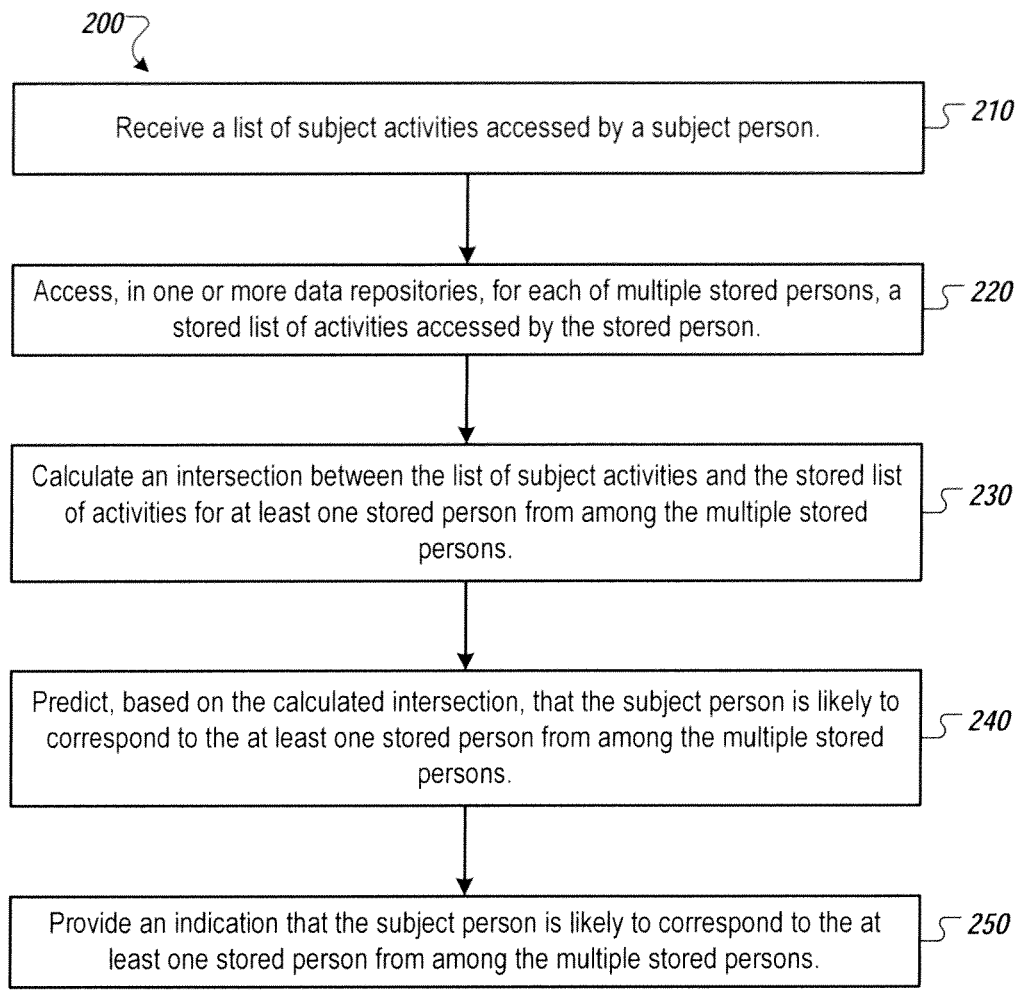
FIG. 2 illustrates an example process by which an identity of a person may be discovered.

FIG. 2 illustrates an example process 200 by which an identity of a person may be discovered.

The process 200 begins at step 210, where a server (e.g., server 120, via operation of the identity prediction module 124) receives (e.g., from client computing device 110) a list of subject activities accessed by a subject person. The list of subject activities can include one or more of: a list of telephone contacts (e.g., telephone numbers dialed or a stored set of telephone numbers on an electronic device), a list of visitors visiting the subject person, a list of Internet pages visited by the subject person, a list of online games accessed by the subject person, a list of educational, religious, or self-help programs accessed by the subject person, etc. Educational programs can include, for example, high school or college courses. Religious programs can include, for example, religious services. Self-help programs can include, for example, programs for curing alcohol or drug addiction. If the subject person has access to an electronic messaging (e.g., email) account, the subject activity list can include contacts from the electronic messaging account. If the subject person has access to a financial account (e.g., a bank account or a prison trust account), the activity list can include funding source(s) for the financial account.

In step 220, the server accesses, in one or more data repositories (e.g., data repository 130), for each of multiple stored persons (e.g., persons 134.1-*n*), a stored list of activities (e.g., activity lists 135.1-*n*) accessed by the stored person. The stored list of activities can include similar information, for the stored person, to the information the list of subject activities includes for the subject person.

In step 230, the server calculates an intersection between the list of subject activities (e.g. received in step 210) and the stored list of activities (e.g., activity list 135.*k*) for at least one stored person (e.g. person 134.*k*) from among the multiple stored persons.

In step 240, the server predicts, based on the calculated intersection, that the subject person is likely to correspond to (e.g., be the same person as) the at least one stored person from among the multiple stored persons in the one or more data repositories.

In step 250, the server provides (e.g., to the client computing device 110) an indication that the subject person is likely to correspond to the at least one stored person from among the multiple stored persons. After step 250, the process 200 ends.

While the subject technology is described herein in terms of analyzing data of inmates in a prison system, the subject technology is not limited to inmates in a prison system and can be applied in other areas where predicting an identity of a person based on an activity history and/or a contact history may be useful. For example, the subject technology can be useful in identifying ownership of electronic messaging (e.g., email) accounts, social networking accounts, mobile devices with contact lists, etc.

Figure 3:
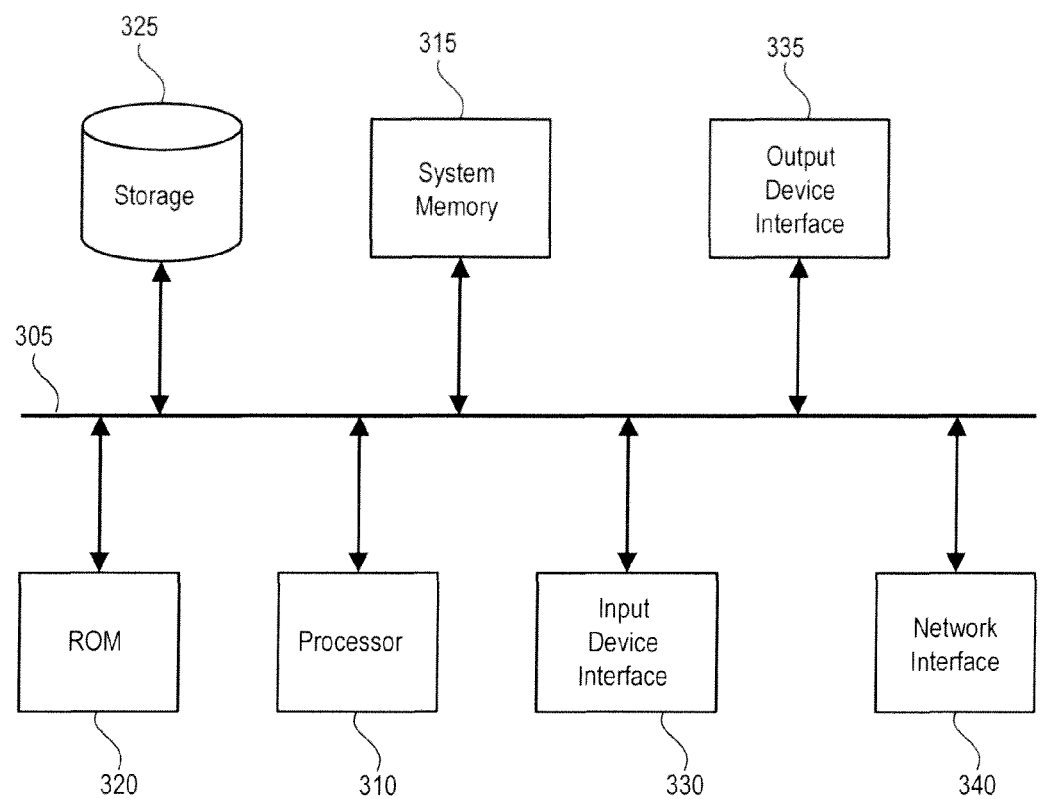
FIG. 3 conceptually illustrates an example electronic system with which some implementations of the subject technology are implemented.

FIG. 3 conceptually illustrates an electronic system 300 with which some implementations of the subject technology are implemented. For example, one or more of the data repository 130, the server 120, or the client computing device 110 may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for predicting an identity of a person based on an activity history in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touch screen that functions as both input and output devices.

Finally, as shown in FIG. 3, bus 305 also couples electronic system 300 to a network (not shown) through a network interface 340. In this manner, the electronic system 300 can be a part of a network of computers (for example a local area network ("LAN"), a wide area network ("WAN"), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives. RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication. e.g. a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for discovering an identity of a person, the method comprising:
   receiving a list of subject activities accessed by a subject person, the list of subject activities comprising a list of telephone numbers dialed by the subject person;
   accessing, in one or more data repositories, for each of a plurality of stored persons, a stored list of activities accessed by the stored person, the stored list of activities comprising a list of telephone numbers dialed by the stored person;
   calculating an intersection between the list of subject activities and the stored list of activities for at least one stored person from the plurality of stored persons;
   predicting, based on the calculated intersection, that the subject person is likely to correspond with the at least one stored person from among the plurality of stored persons;
   providing an indication that the subject person is likely to correspond with the at least one stored person from among the plurality of stored persons; and
   determining, using the list of telephone numbers dialed by the subject person, an earliest telephone number dialed by the subject person during a first time period, wherein predicting that the subject person is likely to correspond to the at least one stored person is based on the stored person having dialed the earliest telephone number dialed by the subject person.

2. The method of claim 1, further comprising:
   determining, using the list of telephone numbers dialed by the subject person, a threshold number of earliest telephone numbers dialed by the subject person during a first time period; and
   determining that the threshold number of earliest telephone numbers dialed by the at least one stored person during a second time period is equivalent to the threshold number of earliest telephone numbers dialed by the subject person during the first time period;
   wherein predicting that the subject person is likely to correspond to the at least one stored person is based on the threshold number of earliest telephone numbers dialed by the at least one stored person during the second time period being equivalent to the threshold number of earliest telephone numbers dialed by the subject person during the first time period.

3. The method of claim 2, wherein the threshold number is 1.

4. The method of claim 2, wherein the threshold number of the earliest telephone numbers dialed by the subject person during a first time period comprises a threshold proportion of the earliest telephone numbers dialed by the subject person during the first time period.

5. The method of claim 1, further comprising:
   filtering out, from the list of telephone numbers dialed by the subject person, one or more commonly dialed telephone numbers; and
   filtering out, from the lists of telephone numbers dialed by the stored persons, one or more commonly dialed telephone numbers.

6. The method of claim 1, wherein the list of subject activities comprises a list of visitors visiting the subject person, and wherein the stored list of activities comprises a list of visitors visiting the stored person.

7. The method of claim 1, wherein the list of subject activities comprises funding sources depositing money into a financial account of the subject person, and wherein the stored list of activities comprises funding sources depositing money into a financial account of the stored person.

8. The method of claim 1, wherein the list of subject activities comprises a contact list from an electronic device of the subject person.

9. The method of claim 1, wherein the subject person is an inmate in a prison, wherein the one or more data repositories comprise one or more data repositories of prison inmates, and wherein providing the indication that the subject person is likely to correspond to the at least one stored person from the plurality of stored persons comprises:
providing, to a client computing device, a photograph of the at least one stored person.

10. A non-transitory computer-readable medium comprising instructions which, when executed by one or more computing devices, cause the one or more computing devices to implement a method, the method comprising:
receiving a list of subject activities accessed by a subject person, the list of subject activities comprising a list of telephone numbers dialed by the subject person;
accessing, in one or more data repositories, for each of a plurality of stored persons, a stored list of activities accessed by the stored person, the stored list of activities comprising a list of telephone numbers dialed by the stored person;
calculating an intersection between the list of subject activities and the stored list of activities for at least one stored person from the plurality of stored persons;
predicting, based on the calculated intersection, that the subject person is likely to correspond with the at least one stored person from among the plurality of stored persons;
providing an indication that the subject person is likely to correspond with the at least one stored person from among the plurality of stored persons; and
determining, using the list of telephone numbers dialed by the subject person, an earliest telephone number dialed by the subject person during a first time period, wherein predicting that the subject person is likely to correspond to the at least one stored person is based on the stored person having dialed the earliest telephone number dialed by the subject person.

11. The computer-readable medium of claim 10, the method further comprising:
determining, using the list of telephone numbers dialed by the subject person, a threshold number of earliest telephone numbers dialed by the subject person during a first time period; and
determining that the threshold number of earliest telephone numbers dialed by the at least one stored person during a second time period is equivalent to the threshold number of earliest telephone numbers dialed by the subject person during the first time period;
wherein predicting that the subject person is likely to correspond to the at least one stored person is based on the threshold number of earliest telephone numbers dialed by the at least one stored person during the second time period being equivalent to the threshold number of earliest telephone numbers dialed by the subject person during the first time period.

12. The computer-readable medium of claim 10, the method further comprising:
filtering out, from the list of telephone numbers dialed by the subject person, one or more commonly dialed telephone numbers; and
filtering out, from the lists of telephone numbers dialed by the stored persons, one or more commonly dialed telephone numbers.

13. The computer-readable medium of claim 10, wherein the list of subject activities comprises a list of visitors visiting the subject person, and wherein the stored list of activities comprises a list of visitors visiting the stored person.

14. The computer-readable medium of claim 10, wherein the list of subject activities comprises funding sources depositing money into a financial account of the subject person, and wherein the stored list of activities comprises funding sources depositing money into a financial account of the stored person.

15. The computer-readable medium of claim 10, wherein the list of subject activities comprises a contact list from an electronic device of the subject person.

16. A system comprising:
one or more processors; and
a memory comprising instructions which, when executed by the one or more processors, cause the one or more processors to implement a method, the method comprising:
receiving a list of subject activities accessed by a subject person, wherein the list of subject activities comprises a list of telephone numbers dialed by the subject person;
accessing, in one or more data repositories, for each of a plurality of stored persons, a stored list of activities accessed by the stored person, wherein the stored list of activities comprises a list of telephone numbers dialed by the stored person;
calculating an intersection between the list of subject activities and the stored list of activities for at least one stored person from the plurality of stored persons;
predicting, based on the calculated intersection, that the subject person is likely to correspond to the at least one stored person from among the plurality of stored persons; and
providing an indication that the subject person is likely to correspond to the at least one stored person from among the plurality of stored persons; and
determining, using the list of telephone numbers dialed by the subject person, an earliest telephone number dialed by the subject person during a first time period, wherein predicting that the subject person is likely to correspond to the at least one stored person is based on the stored person having dialed the earliest telephone number dialed by the subject person.

* * * * *